United States Patent
Ross et al.

(10) Patent No.: US 9,740,672 B2
(45) Date of Patent: Aug. 22, 2017

(54) SYSTEMS AND METHODS FOR DYNAMIC, REAL TIME MANAGEMENT OF CROSS-DOMAIN WEB PLUGIN CONTENT

(71) Applicant: POWr Inc., San Francisco, CA (US)

(72) Inventors: Benjamin Ross, San Francisco, CA (US); Josh May, San Francisco, CA (US)

(73) Assignee: POWR INC., San Francisco, CA (US)

( * ) Notice: Subject to any disclaimer, the term of this patent is extended or adjusted under 35 U.S.C. 154(b) by 197 days.

(21) Appl. No.: 14/523,309

(22) Filed: Oct. 24, 2014

(65) Prior Publication Data

US 2016/0117297 A1    Apr. 28, 2016

(51) Int. Cl.

| G06F 17/30 | (2006.01) |
|---|---|
| G06F 17/00 | (2006.01) |
| G06F 17/22 | (2006.01) |
| G06F 3/0484 | (2013.01) |

(52) U.S. Cl.
CPC ...... *G06F 17/2288* (2013.01); *G06F 3/04847* (2013.01); *G06F 17/227* (2013.01); *G06F 17/2247* (2013.01)

(58) Field of Classification Search
CPC ............. G06F 17/2288; G06F 17/2247; G06F 17/227; G06F 3/04847
USPC .......................................................... 715/241
See application file for complete search history.

(56) References Cited

U.S. PATENT DOCUMENTS

| 7,640,512 B1 | 12/2009 | Appling |
|---|---|---|
| 8,583,738 B2 | 11/2013 | Zuckerberg et al. |
| 2002/0138588 A1* | 9/2002 | Leeds ................. H04L 12/1831 709/217 |
| 2003/0023445 A1 | 1/2003 | Trifon |
| 2005/0050454 A1* | 3/2005 | Jennery ............ G06F 17/30905 715/235 |
| 2006/0031404 A1 | 2/2006 | Kassab |

(Continued)

FOREIGN PATENT DOCUMENTS

WO     2014014695 A1    1/2014

OTHER PUBLICATIONS

"Embedding a document inside another using the <iframe> tag", Javascriptkit, <http://www.javascriptkit.com/howto/externalhtml.shtml>, published prior to: Feb. 11, 2006.*

(Continued)

*Primary Examiner* — Stephen Hong
*Assistant Examiner* — Broderick Anderson
(74) *Attorney, Agent, or Firm* — Dorsey & Whitney LLP

(57) ABSTRACT

The present disclosure relates to methods and apparatuses for seamlessly embedding content from other sources into web pages. Iframes are typically used to embed the content from other sources. The design or style components of the content from other sources displayed through an Iframe may not match the surrounding content of the web page in which the Iframe is embedded. Often updating the style components of an Iframe will require a client to visit the source of the content, update code, and/or refresh the client's webpage to reflect the updated content. Disclosed herein are methods and systems for allowing a client to update style components of content displayed in an Iframe directly from the Iframe, without requiring the client to leave the client webpage, update code, or refresh the client webpage.

24 Claims, 4 Drawing Sheets

(56) References Cited

U.S. PATENT DOCUMENTS

| | | |
|---|---|---|
| 2007/0136320 A1 | 6/2007 | Sah et al. |
| 2007/0299857 A1 | 12/2007 | Gwozdz et al. |
| 2008/0055314 A1* | 3/2008 | Ziemski ............... G06T 11/40 345/441 |
| 2008/0263566 A1 | 10/2008 | Buerge et al. |
| 2009/0037806 A1* | 2/2009 | Yang .................. H04L 67/34 715/234 |
| 2009/0055460 A1 | 2/2009 | Hicks et al. |
| 2009/0276835 A1 | 11/2009 | Jackson et al. |
| 2009/0327421 A1 | 12/2009 | Fu et al. |
| 2009/0328063 A1 | 12/2009 | Corvera et al. |
| 2010/0077350 A1* | 3/2010 | Lim .................... G06Q 10/107 715/810 |
| 2010/0250653 A1 | 9/2010 | Hudgeons et al. |
| 2010/0251095 A1 | 9/2010 | Juvet et al. |
| 2012/0192063 A1 | 7/2012 | Koren et al. |
| 2014/0173414 A1 | 6/2014 | Chan et al. |

OTHER PUBLICATIONS

Wang Jiaye; "Improve cross-domain communication with client-side solutions"; Oct. 14, 2013; developerWorks; <http://www.ibm.com/developerworks/library/wa-crossdomaincomm/>.*

"Media Lab Develops Photoshop Plug-In for Facebook", Wireless News, Published Mar. 17, 2011.

* cited by examiner

SYSTEMS AND METHODS FOR DYNAMIC, REAL TIME MANAGEMENT OF CROSS-DOMAIN WEB PLUGIN CONTENT

BACKGROUND

Inline Frames ("Iframes") are often used to embed third party content into a client's web page. This embedded third party content may be, for example, an advertisement, a YouTube video, a Facebook "like" button, or a Twitter feed. These Iframe components may be referred to, for example, as web plugins, apps, widgets, gadgets, modules, extensions, or simply plugins. In the interest of clarity, these Iframe components will be discussed herein as Iframes, although other examples of Iframe terminology may be used. The interaction between the embedded Iframe content in the client's web page and the third party web page may be referred to as "cross-domain" content management, because the embedded third party Iframe content may be hosted by a different domain (e.g., a third party server) than the domain of the client's web page.

Management and design of third party web plugins is usually managed by the third party website, or alternately may be managed with code. For example, a third party may offer several color choices for the color of a plugin button, which a client may wish to embed in his or her web page. In order to change the color of the button, the client must visit the third party website, use the third party tools to change to color, and finally, the client must often embed a new snippet of code in the client's web page. The client must then reload the web page in order to view the effect of the color change. This procedure is cumbersome and ineffective for quickly designing a plugin to fit attractively within the client's web page.

SUMMARY

Techniques are generally described that include systems and methods for managing cross-domain web plugin content. An example method may include displaying web page content, including at least one Iframe displaying content from a remote domain, communicating design information regarding the web page content to the remote domain, and receiving the content from the remote domain for display in the Iframe, wherein the content has been updated in accordance with the design information.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

Figure 1A:
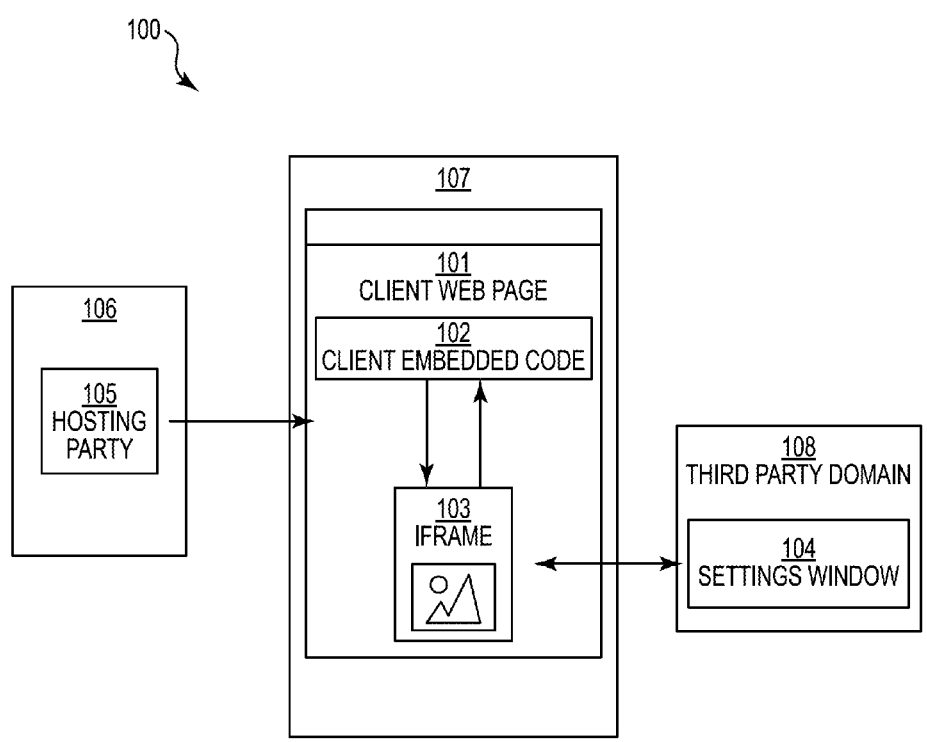
FIG. 1A illustrates an example system including a client web page with an embedded Iframe containing third party content and a settings window hosted by a third party domain.

all arranged in accordance with at least some embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, products, devices, and/or apparatuses generally related to seamlessly managing embedded Iframe content. Generally, a client manages third party Iframe content on a client's web page through the third party's website and web tools. The client may then be required to update code on the client's website and may also need to refresh or reload the client's web page to reflect the changes. There is a need to simplify the process of updating Iframe content, so that third party Iframe content may be updated directly, dynamically, or even automatically from the client web page, eliminating the need to visit a third party website, update code, or refresh or restart the client's browser.

In some examples, a settings window for the Iframe may be provided that may allow a client to make real time changes to the embedded Iframe content. A local copy of the embedded content may be stored, and changes to the content may be made through the settings window, which may be viewed at the Iframe in real time. For example, the design elements of the content displayed in the Iframe may be changed or, in some examples, additional content may be added or subtracted (e.g., text, etc.). Changes may be made to the local copy of the content and viewed in the Iframe in real time without, for example, a need to log into or otherwise access the third party site that hosts the Iframe content. Once a final set of settings are chosen, the altered content may be saved back to a database on the hosting party site, and will appear in accordance with the final selected, and saved Iframe settings.

In some examples, code in a client web page may be configured to communicate design information about the client web page (e.g. font styles, background color) to the Iframe and the Iframe content may automatically incorporate the design information of the client web page in order to display Iframe content using similar or coordinating design information. Such design information may include, but is not limited to, font families, font sizes, font colors, font-weights, font-styles, background colors, shadows, margins, background, borders, directions, line-height, opacity, positioning, alignment, and padding. Such design information will collectively be referred to herein as style components.

FIG. 1A is a schematic illustration of a system 100 with cross-domain messaging that includes a client web page with an embedded Iframe displaying third party content, according to an embodiment of the invention. FIG. 1A shows system 100, client web page 101, client embedded code 102, Iframe 103, settings window 104, hosting party 105, remote domain 106, client domain 107, and third party domain 108. The various components described in FIG. 1A are merely examples, and other variations, including eliminating components, combining components, and substituting components are all contemplated.

System 100 may include client web page 101. Client web page 101 is a web page where the client's content is visible, and where one or more Iframes or plugins may be added. Client web page 101 may be hosted by a website builder, content management system, or may be hosted independently. Client web page 101 may be hosted on a different domain than that of hosting party 105, for example client domain 107. Client domain 107 may be a computer or a server, such as a webserver. Client web page 101 may be viewed by the client through a browser window of a browser, such as Apple Safari, Internet Explorer, Mozilla Firefox, Google Chrome, or the like. Hosting party 105 may be hosted by remote domain 107. Remote domain 107 may be a computer or a server, such as a web server. Client web page 101 may include client embedded code 102. Client embedded code 102 may be a scripting language written in, for example, Javascript, ActiveX, Java, Dart, TypeScript, or VBScript. Client embedded code 102 may be hosted by the client via client domain 107, the hosting party 105 via remote domain 106, a third party via third party domain 108, or by another party via another domain not illustrated.

Client embedded code 102 may interact with Iframe 103 through cross domain messaging (XDM). Client embedded code 102 may interact with other code on client web page 101, and may replace identifiable tags or shortcode with an Iframe, for example Iframe 103. Cross domain messaging may be described as when a web page or document hosted on a first domain, such as a first web server, interacts or communicates with a web page or document on a second domain, such as a second web server. Through cross domain messaging, content from a first domain may be updated from a second domain, and vice versa. Thus client embedded code 102 on client domain 107 may be capable of identifying particular tags or shortcodes that may indicate the client's desired placement of Iframe 103 from third party domain 108. Client embedded code 102 may create one or more Iframe views for Iframe 103 from third party domain 108 and client embedded code 102 may communicate with these Iframe views through cross domain messaging. Client embedded code 102, through cross domain messaging, may also receive size information and events from Iframe 103, and may resize Iframe 103 and also may send style components from client web page 101 to be saved on a database on third party domain 108. The style components may include, for example, font, style, color and uniform resource identifier (URI) information. A database on third party domain 108 may then be updated to reflect the style components from client web page 101.

Iframe 103 may contain the visual display and model data of the third party web plugin from third party domain 108. Through cross domain messaging, Iframe 103 may receive information about client web page 101, which may then be communicated to third party domain 108. Similarly, through cross domain messaging, Iframe 103 may send content size, design, and event information from third party domain 108 to client embedded code 102 on client domain 107. Iframe 103 may also be configured to trigger the opening or appearance of settings window 104 responsive to input from the client. Settings window 104 may be a pop-up window or menu, and may be configured to receive input from the client.

Settings window 104 may visually display options for the settings for Iframe 103 from third party domain 108 From settings window 104, the client may be able to update or change the settings for Iframe 103. When the client changes settings in Iframe 103 via settings window 104, the view of Iframe 103 will immediately re-render reflecting the changes. This real-time rendering of the changes is accomplished through communication between Iframe 103 and settings window 104, and does not require that client web page 101 be refreshed or reloaded. These changes in Iframe 103 may be displayed to the client before any changes are saved to the content at third party domain 108.

The following will describe an example operation according to an embodiment of the invention corresponding to FIG. 1A. The client may first add client embedded code 102 to client web page 101. The client may then enter a tag or shortcode on the web page code, where the tag or shortcode is identifiable by client embedded code 102. Client embedded code 102 may then replace the tag or shortcode with Iframe 103. Through cross domain messaging, client embedded code 102 may pass style components related to client web page 101 to Iframe 103. Iframe 103 may incorporate the style components in order to dynamically determine the styling of the view of content within Iframe 103. The client may then click on Iframe 103 in order to trigger the opening of settings window 104. The client may then change or update the settings for Iframe 103 from the options available in settings window 104. All, or a portion of Iframe 103 will be updated and re-rendered to reflect any changes made by the client. The changes may affect the size of Iframe 103 itself, or, for example, the color, font size, or appearance of the content of Iframe 103. The changes in the settings of Iframe 103 will then be communicated to third party domain 108 through settings window 104. The changes to the settings of Iframe 103 will then be saved to third party domain 108. After the changes in the settings of Iframe 103 are saved, when a user visits client web page 101, Iframe 103 will be created and displayed by client embedded code 102 reflecting the settings last saved by the client in settings window 104.

Figure 1B:
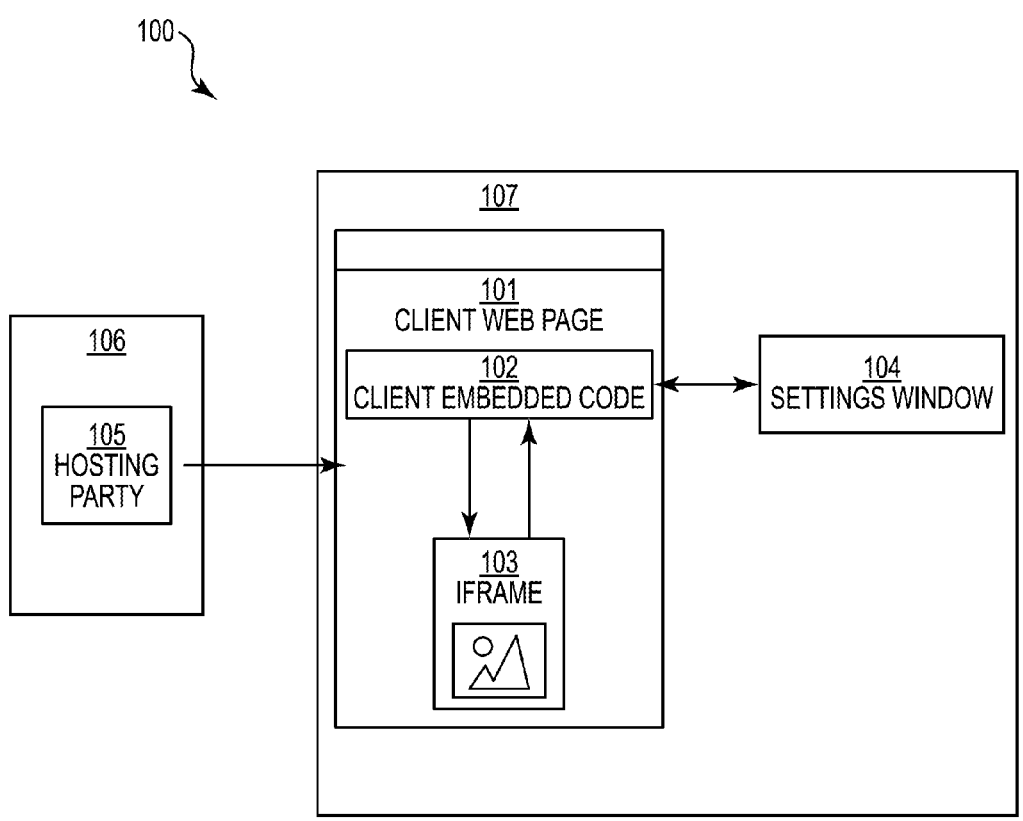
FIG. 1B illustrates an example system including a client web page with an embedded Iframe and a settings window hosted by a client domain.

FIG. 1B is a schematic illustration of a system 100 with cross-domain messaging that includes a client web page with an embedded Iframe, according to an embodiment of the invention. FIG. 1B shows system 100, client web page 101, client embedded code 102, Iframe 103, settings window 104, hosting party 105, remote domain 106, and client domain 107. The various components described in FIG. 1B are merely examples, and other variations, including eliminating components, combining components, and substituting components are all contemplated.

FIG. 1B illustrates an alternative to the example system 100 as described above with respect to FIG. 1A. System 100 of FIG. 1B is differentiated from that of FIG. 1A in that settings window 104 is generated in response to client embedded code 102. Settings window 104 may be a new browser window, pop-up, or an element of client web page 101. Client embedded code 102 may communicate any changes made by the client in settings window 104 to content in Iframe 103. These changes to the content of Iframe 103 may be rendered to the client in the view of Iframe 103. In settings window 104, the client may also save changes to the content of Iframe 103. When Iframe 103 is next rendered to a user or the client, the view of Iframe 103 may reflect the saved changes to the content of Iframe 103. Settings window 104 may be hosted by client domain 107.

Figure 2:
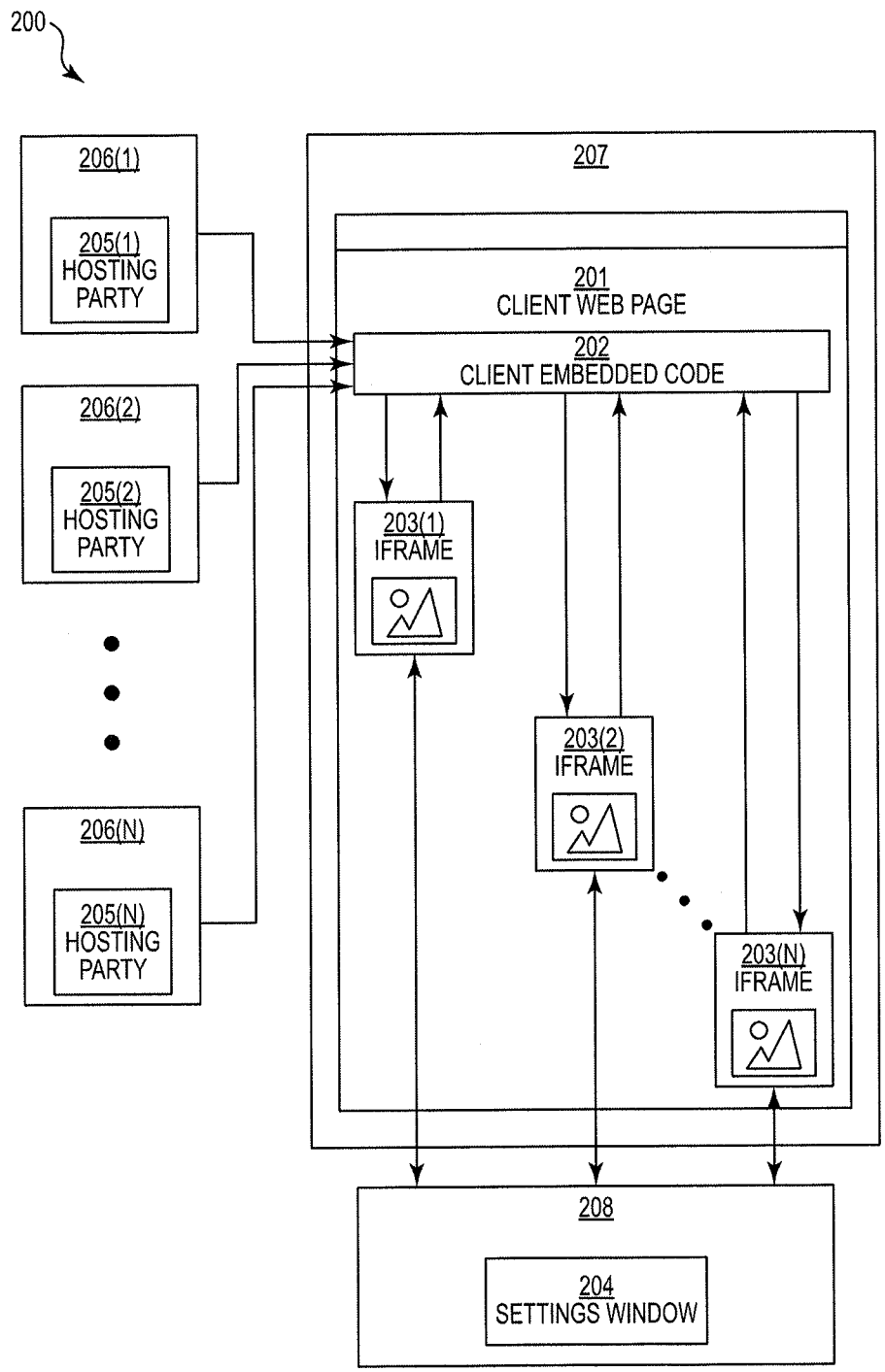
FIG. 2 illustrates an example system including a client web page with multiple embedded Iframes containing third party content.

FIG. 2 is a schematic illustration of a system 200 with cross-domain messaging that includes a client web page 201 with multiple embedded Iframes 203(1-N) displaying third party content according to an embodiment of the invention. FIG. 2 shows system 200, client web page 201, client embedded code 202, Iframes 203(1-N), settings window 204(1-N), hosting parties 205(1-N), remote domains 206(1-N), client domain 207, and third party domains 208(1-N). The various components described in FIG. 2 are merely examples, and other variations, including eliminating components, combining components, and substituting components are all contemplated.

While the example system 100 discussed above with respect to FIGS. 1A and 1B describe a single instance of client embedded code 102 and corresponding Iframe 103, client embedded code may correspond to multiple Iframes embedded on client web page. The settings of these multiple Iframes may be controlled individually by multiple respective settings windows, for example, as described with respect to FIGS. 1A and 1B, where Iframe 103 may be controlled by corresponding settings window 104. Alternately, as described with respect to FIG. 2, a parent settings window 204 may be triggered that corresponds to multiple Iframes 203(1-N) and allow the client to update settings for multiple Iframes 203(1-N) all at once from within parent settings window 204. As discussed with respect to FIGS. 1A and 1B, when the client changes settings in parent settings window 204, Iframes 203(1-N) may be updated dynamically in real-time, reflecting the changes to the settings selected by the client in parent settings window 204, before any changes to the settings for third party content are saved at any of multiple third party domains 208(1-N). This will allow the client to visualize any content changes immediately, without having to wait for content to be saved at any of multiple third party domains 208(1-N). Iframes 203(1-N) may correspond to third party content hosted by multiple third party domains 208(1-N). Selected Iframes of Iframes 203(1-N) may correspond to content from a selected single third party domain from multiple third party domains 208(1-N), or alternately each Iframe from Iframes 203(1-N) may correspond to a respective third party domain from multiple third party domains 208(1-N).

The foregoing discussion of updating Iframe content has been in terms of the client's actions in changing settings for style components from a settings window, such as settings window 104 or parent settings window 204, as described with respect to FIGS. 1 and 2. As the following discussion of FIG. 3 describes, it is also contemplated that Iframe content may present a client with Iframe style component setting options, or be updated automatically, based on a statistical analysis of the style components surrounding the location of an Iframe from the client web page. The statistical analysis of the style components of the client web page is implemented through client embedded code, such as client embedded code 102 or client embedded code 202, as described with respect to FIGS. 1A, 1B, and 2. Alternatively, the style components of the client web page may be passed to the Iframe and the statistical analysis of the style components may be performed at the third party domain. For example, style components of client web page 101 may be passed to Iframe 103 and the statistical analysis of the style components may be performed at third party domain 208. In another example, style components of client web page 201 may be passed to Iframes 203(1-N) and the statistical analysis of the style components may be carried out at respective third party domains 208(1-N). As used herein, automatically may refer to the statistical analysis of the style components being performed by the client embedded code or at a third party domain in response to the client embedding an Iframe.

Figure 3:
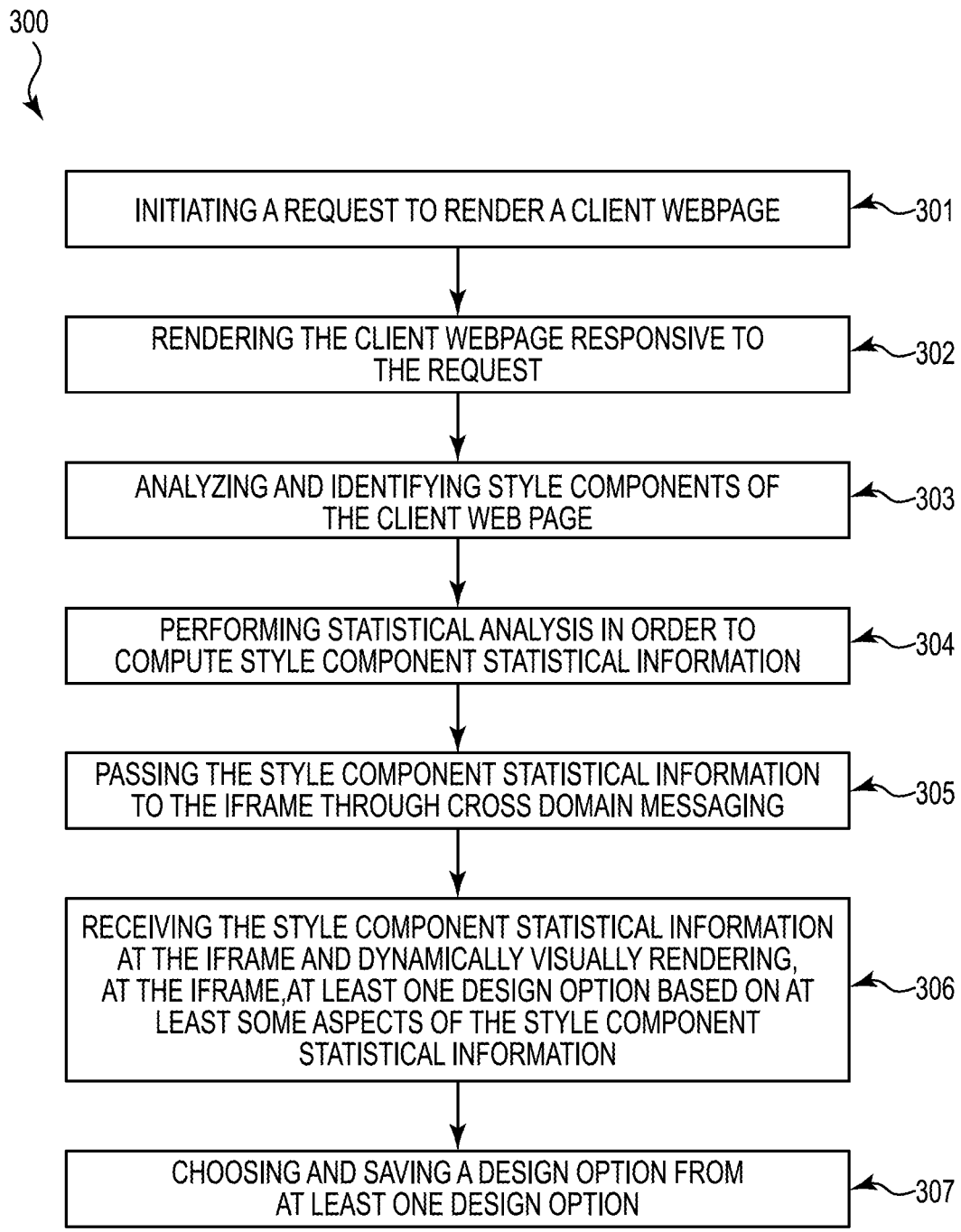
FIG. 3 is a flowchart illustrating an example method in which an Iframe's style component settings are determined automatically responsive to an analysis of surrounding content on a client web page.

FIG. 3 is a flowchart that illustrates an example method in which options for changing the style components of an Iframe's content are determined automatically responsive to an analysis of the style components of surrounding content on a client web page. An example method may include one or more operations, functions, or actions as illustrated by one or more of blocks 301, 302, 303, 304, 305, 306, and/or 307.

An example process 300 may begin with block 301, which recites "initiating a request to render a client webpage." Block 301 may be followed by block 302, which recites "rendering the client webpage responsive to the request." Block 302 may be followed by block 303, which recites "analyzing and identifying style components of the client web page." Block 303 may be followed by block 304, which recites "performing statistical analysis in order to compute style component statistical information." Block 304 may be followed by block 305, which recites "passing the style component statistical information to the Iframe through cross domain messaging." Block 305 may be followed by block 306, which recites "receiving the style component statistical information at the Iframe and dynamically visually rendering at the Iframe at least one design option based on at least some aspects of the style component statistical information." Block 306 may be followed by block 307, which recites "choosing and saving a design option from at least one design option."

The blocks include in the described example method are for illustration purposes. In some embodiments, the blocks may be performed in a different order. In some embodiments, various blocks may be eliminated. In still other embodiments, various blocks may be divided into additional blocks, supplemented with other blocks, or combined together into fewer blocks. Other variations of theses specific blocks are contemplated, including changes in the order of the blocks, changes in the content of the blocks being split or combined into other blocks, etc.

Block 301 recites "initiating a request to render a client web page." The request may be initiated, for example by a user or client at a web browser, such as Internet Explorer, Google Chrome, Mozilla Firefox, Apple Safari, or the like. The client web page may be hosted, for example, by domain 107 or domain 207, as described with respect to FIGS. 1A, 1B, and 2.

Block 302 recites "rendering the client web page responsive to the request." The client web page may be rendered and displayed by the web browser to the user or client. Client web page may be rendered as client web page 101 or client web page 201, as described with respect to FIGS. 1A, 1B, and 2.

Block 303 recites "analyzing and identifying style components of the client web page." This analysis and identification may be performed by the client embedded code that "scrapes" the other code in the client web page in order to determine the style components contained within the client web page. The client embedded code may be, for example, client embedded code 102 or client embedded code 202 as described with respect to FIGS. 1A, 1B, and 2. The style components may include such design information as font families, font sizes, font colors, font-weights, font-styles, background colors, shadows, margins, background, borders, directions, line-height, opacity, positioning, alignment, and padding. The style components may vary throughout different portions of the client web page.

Block 304 recites "performing statistical analysis in order to compute style component statistical information." This statistical analysis may be performed by client embedded code, and may include the computation of at least one of mean, median, mode, range, standard deviation, standard variance, cluster analysis, or other statistical information regarding the style components of the client web page. For example, the client embedded code may compute style component statistical information for common HTML styles such as: average <p> font-size: 12 px; average <h2> font-size: 14 px; median <p> font color: #000; median <h2> font color #c0c0c0; page background color: #ccc; etc. The client embedded code may be, for example, client embedded code 102 or client embedded code 202, and may analyze client web page 101 or client web page 202 as described with respect to FIGS. 1A, 1B, and 2.

Block 305 recites "passing the style component statistical information to the Iframe through cross domain messaging." The client embedded code may pass the style component statistical information through cross domain messaging to an Iframe embedded on the client web page, for example client embedded code 102 may pass style component statistical information from client web page 101 to Iframe 103, as described in FIGS. 1A and 1B. In another example, client embedded code 202 may pass style component statistical information from client webpage 201 to Iframes(1-N), as described in FIG. 2.

Block 306 recites "receiving the style component statistical information at the Iframe and dynamically visually rendering, at the Iframe, at least one design options based on at least some aspects of the style component statistical information." The multiple design options may be presented by way of a settings window, such as settings window 104 or parent settings window 204 as described with respect to FIGS. 1A, 1B, and 2. The multiple design options may match the style component statistical information of the client web page overall, or may match a portion of the client web page, for example particular client web page code tag. For example, the multiple design options may include: <p>: font color inherited from average font color of the fonts the client web page; <p>: background color based on the client web page background color; or <p>: font color based on contrast against the client web page background color. These multiple design options may be visually presented to the client at the Iframe, and may be updated dynamically based on the client's actions. Alternatively, the client embedded code may choose the design option from the multiple design options that most closely matches the style component statistical information of the client web page. For example, client embedded code 102 may analyze the style components surrounding the location of Iframe 103 in response to the client choosing a location for embedding Iframe 103 on client web page 101, as described with respect to FIGS. 1A and 1B. Client embedded code 102 may then present the style component analysis visually as multiple design options to the client through settings window 104. In an alternate example, client embedded code 202 may analyze style components surround the locations of Iframes 203(1-N) in response to the client choosing multiple locations on client web page 201 for Iframes 203(1-N), as described with respect to FIG. 2. Client embedded code 202 may then present the style component analysis for multiple Iframes 203(1-N) through parent settings window 204. Alternately, client embedded code 202 may present the style component analysis for multiple Iframes 203(1-N) individually through multiple respective settings windows.

Block 307 recites "choosing and saving a design option from at least one design option." The client may choose and save, at the Iframe, one of the visually rendered design options from at least one design option presented. Alternatively, the Iframe may automatically choose and save the design option from the multiple design options in response to the client embedding the Iframe, such as Iframe 103 or Iframes 203(1-N), as described with respect to FIGS. 1A, 1B and 2. In one example, changes made to Iframe 103 may be selected and saved to third party domain 108 by the client through settings window 104. The next time Iframe 103 is rendered to a user or the client, the view of Iframe 103 will reflect the saved design option. In an alternate example, changes may be made to Iframes 203(1-N) and saved by the client to third party domains 208(1-N) through parent settings window 204, or through multiple respective settings windows. The next time Iframe 203(1-N) are rendered to a user or the client, the views of Iframes 203(1-N) will reflect the saved design options.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A computer system programmed to update embedded content, the computer system comprising at least one non-transitory computer readable medium, the non-transitory computer readable medium having instructions encoded thereon, comprising instructions for:
displaying web page content, including at least one Iframe providing content from a remote domain;
generating design information based on a statistical analysis of style components of the web page content;
displaying a settings window responsive to a client request, wherein the settings window provides options for the content from the remote domain, wherein the settings window is separate from the at least one Iframe;
updating a local version of the content in the at least one Iframe as the client provides input to the settings window;
re-displaying at least one Iframe in real time responsive to client input to the settings window, at least one of the re-displayed Iframes providing an updated local version of the content, wherein redisplaying comprises passing the updated local version of the content to the at least one Iframe using cross domain messaging;
communicating the updated local version of the content to the remote domain in accordance with the input to the settings window;
communicating the design information regarding the web page content to the remote domain; and
receiving the content from the remote domain for display in the at least one Iframe, wherein the content has been updated in accordance with the design information.

2. The computer system of claim 1, wherein the instructions further comprise:
saving the updated content at the remote domain.

3. The computer system of claim 1, wherein the design information further comprises:
font families, font sizes, font colors, font-weights, font-styles, background colors, shadows, margins, padding, background, borders, directions, line-height, opacity, positioning, alignment, or combinations thereof.

4. The computer system of claim 1, wherein the at least one Iframe is generated by client embedded code within the web page.

5. The computer system of claim 1, wherein the at least one Iframe is generated by a tag or shortcode within the web page.

6. The computer system of claim 4, wherein the client embedded code comprises one of: JavaScript, ActiveX, Java, Dart, TypeScript, or VBScript.

7. The computer system of claim 4, wherein cross domain messaging is initiated between the at least one Iframe and the client embedded code.

8. The computer system of claim 1, wherein the instructions further comprise:
displaying a settings window for the at least one Iframe, responsive to a client request.

9. The computer system of claim 8, wherein the settings window allows the client to choose design options for display in the at least one Iframe.

10. The computer system of claim 9, wherein the settings window visually renders in real-time design options for display in the at least one Iframe.

11. The computer system of claim 4, wherein the statistical analysis of style components of the web page content is computed by the client embedded code within the webpage.

12. The computer system of claim 11, wherein the statistical analysis includes at least one of mean, median, mode, range, standard deviation, standard variance, or cluster analysis of design information.

13. A computer system programmed for update of embedded content, the computer system comprising at least one non-transitory computer readable medium, the non-transitory computer readable medium having instructions encoded thereon, comprising instructions for:
displaying web page content, the web page content including at least one Iframe that provides content from a remote domain;
generating design information based on a statistical analysis of style components of the web page content;
displaying a settings window responsive to a client request, wherein the settings window provides options for the content from the remote domain, the options based on the generated design information, wherein the settings window is separate from the at least one Iframe;
updating a local version of the content in the at least one Iframe as the client provides input to the settings window;
re-displaying the at least one Iframe in real time responsive to client input to the settings window, at least one of the re-displayed Iframe providing an updated local version of the content, wherein redisplaying comprises passing the updated local version of the content to the at least one Iframe using cross domain messaging; and
communicating the updated local version of the content to the remote domain in accordance with the input to the settings window.

14. The computer system of claim 13, wherein the at least one Iframe is generated by client embedded code within the web page; and wherein the client embedded code comprises code for statistical analysis of style components of the web page content.

15. The computer system of claim 14, wherein the analysis of style components comprises computing at least one of mean, median, mode, range, standard deviation, standard variance, or cluster analysis of style components.

16. The computer system of claim 15, wherein the style components include font families, font sizes, font colors, font-weights, font-styles, background colors, shadows, margins, padding, background, borders, directions, line-height, opacity, positioning, alignment, or combinations thereof.

17. The computer system of claim 13, wherein updating the content in the at least one Iframe further comprises rendering the content in real-time.

18. The computer system of claim 13, wherein communicating updated content further comprises saving the updated content to the remote domain.

19. A computer system programmed to update embedded content, the computer system comprising at least one non-transitory computer readable medium, the non-transitory computer readable medium having instructions encoded thereon, comprising instructions for:
displaying web page content, including a plurality of Iframes that provides content from a remote domain;
displaying a settings window responsive to a client request, wherein the settings window provides options for the content from the remote domain, wherein the settings window is separate from the plurality of Iframes;
updating a local version of the content in the plurality of Iframes as the client provides input to the settings window;
re-displaying at least one of the plurality of Iframes in real time responsive to the client input to the settings window, at least one of the re-displayed Iframes providing the updated local version of the content, wherein redisplaying comprises passing the updated local version of the content to the at least one of the plurality of Iframes using cross domain messaging; and
communicating the updated local version of the content to the remote domain in accordance with the input to the settings window.

20. The computer system of claim 19, wherein the settings window is a parent settings window that provides options for the plurality of Iframes.

21. The computer system of claim 19, wherein the settings window is a settings window of a plurality of settings windows that provide options to a respective Iframe of the plurality of Iframes.

22. The computer system of claim 19, wherein communicating the updated content further comprises saving the updated content to the remote domain.

23. The computer system of claim 19, wherein the options for the content are based on statistical analysis of style components from the client web page.

24. The computer system of claim 23 wherein the statistical analysis of style components includes at least one of mean, median, mode, range, standard deviation, standard variance, or cluster analysis of font families, font sizes, font colors, font-weights, font-styles, background colors, shadows, margins, padding, background, borders, directions, line-height, opacity, positioning, alignment, or combinations thereof.

* * * * *